Patented Jan. 17, 1950

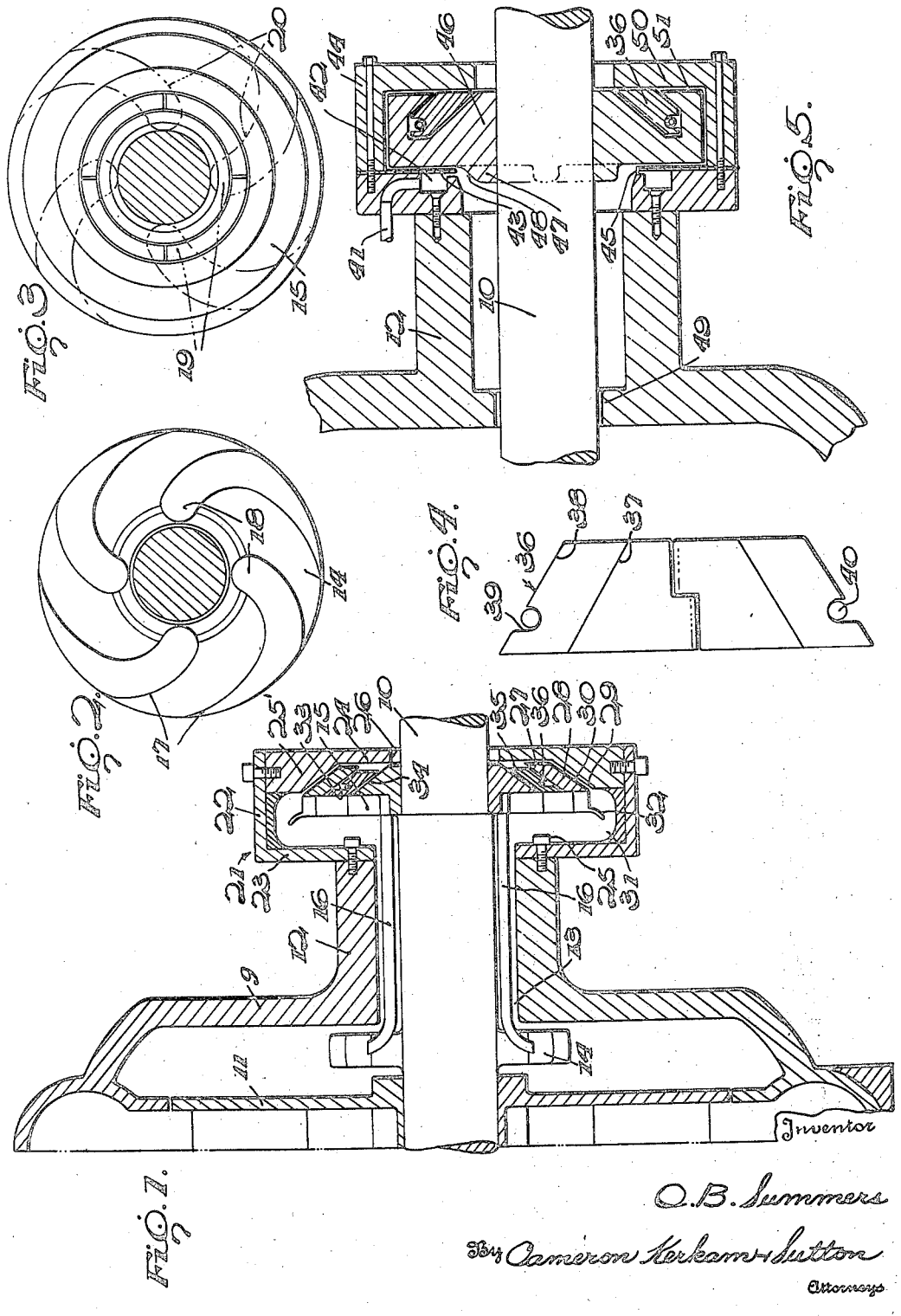

2,494,971

UNITED STATES PATENT OFFICE 2,494,971

SEALING DEVICE FOR SHAFTS

Orran B. Summers, Morenci, Ariz., assignor to Jet Shaft Seals, Inc., Phoenix, Ariz., a corporation of Arizona Application April 27, 1944, Serial No. 533,021

21 Claims. (Cl. 286—9)

This invention relates to shaft seals, and more particularly to sealing devices for the shafts of liquid pumps, but as will be apparent to those skilled in the art the invention is of wider utility, and may be applied to seal the clearance between a rotatable shaft and the contiguous wall of a casing in a wide variety of devices.

Conventional shaft seals for liquid pumps employ some form of gland which incorporates packing material placed under compression to fill the clearance between the shaft and the surrounding casing wall. If the packing material is placed under sufficient compression to so grip the surface of the shaft as to assure against substantial leakage, there is a material loss of energy because of the friction set up between the rotating shaft and stationary packing material. In fact the rubbing of the packing material on the shaft frequently results in a grooving of the shaft, with resultant loss of sealing relationship, which must be followed by a machining of the shaft to remove the groove, and then after a few resizing operations the shaft has to be entirely replaced. The alternative for large friction losses and worn shafts is to place the packing material under less compression, and this is accompanied by increased leakage of the liquid with the requirement for rather expensive drip boxes or drip wells and waste pipe systems to take care of the leakage. Indeed, the danger of leakage increasing as the packing and shaft wear is such that it is common practice to install such drip boxes or drip wells and waste systems even though it is intended initially to set up the packing tightly enough, and in spite of friction losses, to minimize leakage.

Various schemes have heretofore been proposed for eliminating the necessity of tight rubbing packing to prevent the flow of fluid between a shaft and the wall of the opening through which it passes. Devices of this type generally employ relatively rotatable members respectively mounted on and surrounding the shaft to provide one or more relatively narrow annular spaces which are kept filled with a liquid by the action of centrifugal force on liquid supplied to the chamber or chambers in which the rotatable member or members are rotating. In some devices the rotatable member is in the form of a centrifugal pump element that maintains a circulation of liquid, while in others the rotatable member maintains an annular film or layer of liquid in which the periphery of the rotatable member is kept immersed. Some devices have been constructed so as to maintain a circulation of liquid between the sealing provision and a source of external liquid, while other devices maintain an internal circulation through the peripherally disposed narrow annular chamber surrounding the rotatable member by reason of the differential action of the pressures existing at opposite sides of the rotatable member. But devices of the types heretofore proposed have not proved entirely satisfactory because of a number of reasons, among which may be noted the need for supplying a system through which liquid may flow to and from the sealing device, or the need for priming the seal so as to introduce sufficient liquid to establish the sealing film when the shaft starts to rotate, or the complexity and cost of the sealing equipment offsetting the saving to be effected, etc.

It is an object of this invention to provide an improved shaft sealing device which utilizes a fluid as the sealing medium while avoiding the expense and complication of auxiliary systems for supplying sealing liquid as above referred to.

Another object of this invention is to provide an improved device of the type characterized which does not require priming in order to establish the seal when the shaft starts to rotate.

Another object of this invention is to provide a device of the type characterized which utilizes a fluid taken from a casing to maintain a pressure exteriorly of the casing sufficient to cause the same to flow back into the casing and thereby prevent escape thereof along the shaft.

Another object of this invention is to provide a device of the type last characterized which is so constructed as to establish a suction in the clearance space between the shaft and the housing for the sealing device where the shaft passes through said housing into the external air, so that the sealing device draws air into the same to counteract any tendency of the contained sealing fluid to flow out of the sealing device along the shaft.

Another object of this invention is to provide a sealing device of the type above characterized with means automatically operative when the shaft ceases to rotate for filling the clearance space through which the contained sealing fluid would tend to escape from the sealing device in the absence of such a provision, but which means also operates automatically to open the clearance space when the shaft attains a predetermined speed.

Another object of this invention is to provide a shaft sealing device which utilizes a liquid taken from the casing with which the seal is to be associated and then steps up the pressure of said liquid so as to fill the clearance between the shaft and the surrounding casing wall with a liquid under higher pressure than exists within the casing adjacent the shaft.

Another object of this invention is to provide a shaft sealing device which may utilize fluid pressure developed within the casing and which propels said fluid at proper pressure to fill the clearance between the shaft and the surrounding casing wall to prevent flow thereof in the opposite direction along the shaft.

Another object of this invention is to provide a shaft sealing device which operates on the principle of withdrawing fluid from inside of a casing and imposing a pressure thereon which, when applied to the clearance between the shaft and the casing wall, will establish and maintain a flow of fluid from the exterior to the interior of said casing through the clearance that would otherwise be a source of leakage.

Another object of this invention is to provide a device of the type last characterized which is so constructed as to maintain a suction on any clearance space not filled with sealing fluid by the sealing device.

Another object of this invention is to provide a device of the type last characterized which has automatic means for opening and closing the clearance space in which suction is maintained, depending upon whether the shaft is in rotation or at rest.

Another object of this invention is to provide a shaft sealing device which is relatively simple in construction, inexpensive to fabricate, install and maintain and highly efficient in operation.

Other objects will appear as the description of the invention proceeds.

The invention is capable of receiving a variety of mechanical expressions, two of which are illustrated on the accompanying drawing, but it is to be expressly understood that the drawing is for purpose of illustration only, and is not to be construed as a definition of the limits of the invention, reference being had to the appended claims for that purpose.

Referring in detail to the accompanying drawing, wherein like reference characters are employed to designate corresponding parts in the several figures.

Fig. 1 is a somewhat schematic vertical section through a sealing device embodying the present invention and applied to the casing of a rotary pump;

Fig. 2 is a diagrammatic face view on a larger scale of an impeller which by preference is used in the present invention;

Fig. 3 is a diagrammatic view, on a smaller scale than Fig. 2, of the principal impeller;

Fig. 4 is an enlarged sectional view of an automatic sealing ring for opening and closing the air clearance space hereinbefore referred to; and Fig. 5 is a somewhat schematic vertical section, comparable to Fig. 1, but illustrating the use of liquid at the pressure developed in the casing for sealing the clearance between the shaft and the casing wall.

In the form shown in Figs. 1 to 4, 10 designates any suitable shaft to which the seal of the present invention is to be applied, said shaft and sealing device parts rotating therewith being sometimes herein called the rotor. Said shaft is here shown as the shaft of a centrifugal pump for pumping liquid, but it is to be expressly understood that by adaptation the present invention may be applied to other suitable devices where escape of fluid through a clearance is to be prevented. As the details of the pump constitute no part of the present invention, the pump has been indicated diagrammatically at 11 and may be of any suitable construction. Between the periphery of the shaft and the surrounding casing wall 9 of the fluid chamber of the pump there is a clearance at 13 which is to be sealed by the sealing device of the present invention.

Mounted on the shaft for rotation therewith in any suitable way, and preferably in the form of a unit, is an inner impeller 14, an outer impeller 15 and one or more pipes 16 communicating with both said impellers adjacent the centers thereof. Where there is no danger of an air lock, so that it is safe to rely on liquid being withdrawn from the interior of the pump casing by the action of the impeller 15 when rotation of the shaft is started, the inner impeller 14 may be omitted, but to assure that the sealing device goes into operation with certainty when the shaft starts in rotation, I preferably use an inner impeller 14 for the purpose of abstracting liquid from the interior of the casing and imposing an initial pressure thereon in the pipes 16. Impeller 14 may be of any suitable construction, being shown as an open impeller having curved vanes 17 of any suitable number, as shown in Fig. 2, to provide passages leading to the inlets 18 of the pipes 16. The vanes 17 are curved appropriately in the direction of shaft rotation, and the impeller 14 is of such diameter that when the shaft is rotated at normal speed liquid will be taken from the interior of the casing and delivered to the inlets 18 of the pipes 16 at a sufficient pressure to cause flow through said pipes and into impeller 15. Any suitable number of pipes may be employed, and at their opposite ends they are connected in any suitable manner to the inlets 19 of the impeller 15. The two impellers with their interconnected pipes are preferably formed in any suitable way to constitute a single unit which may be mounted on the shaft in any suitable way for rotation therewith. As shown somewhat diagrammatically in Fig. 3, the impeller 15 is a closed impeller and is of larger diameter than the impeller 14. As illustrated, said impeller has any suitable number of curved vanes 20 providing therebetween passages which communicate with the pipes 16. The vanes of impeller 15 are appropriately curved in the opposite direction from that of impeller 14 so as to impel outwardly and develop a proper pressure in the liquid delivered thereto by the pipes 16. Owing to the larger diameter of impeller 15, the pressure developed in the liquid thereby at the outlets thereof will be materially higher than the pressure developed by the impeller 14 as delivered to the pipes 16.

Surrounding the shaft is a seal housing 12 which encloses a seal chamber and carries, as a part of said housing, a member which provides a housing 21 for the impeller 15 and which may be of any suitable construction and mounted or supported in any suitable way. As shown the impeller housing has a peripheral wall 22 and side walls 23 and 24, the inner side wall 23 being mounted on the pump casing in any suitable way as by bolts or screws 25 secured to housing 12. The outer side wall 24 closely surrounds the periphery of the shaft at a terminal opening 26, leaving a narrow clearance space 27 between it and the lateral wall of the impeller 15. At or adjacent its periphery the outer lateral wall of the impeller 15 is provided with a conically shaped surface 28, and the lateral wall 24 of the impeller housing is also correspondingly shaped as shown at 29, as by thickening the wall 24 at 25', so as to provide a narrow clearance space 30 which, at one end, communicates with the clearance space 27, and at its opposite end, communicates, at the periphery of the impeller, with the chamber 31 in the interior of the impeller housing. The outlets of the impeller 15 are properly shaped, as by use of fin 32, to direct the liquid flowing from the impeller 15 toward the interior of chamber 31, providing an aspirating action and establishing a small suction in the clearance spaces 30 and 27, herein sometimes called a restricted passage. Thereby, air is drawn into the clearance 26 and through the clearance spaces 27 and 30 to oppose any escape of liquid in the opposite direction to and along the shaft.

While such suction is desirable when the shaft is in rotation, when the shaft ceases to rotate, if the impeller housing is full of liquid, there will be at least some leakage through said clearance spaces along the shaft. Hence it is desirable to seal off said clearance spaces as soon as the shaft stops rotating, or decreases its speed so as no longer to maintain said suction, in order to retain the impeller housing full of liquid. In conformity with the present invention the outer lateral wall of the impeller 15 has suitably provided therein or thereon a pair of conical inwardly directed surfaces 33 and 34, preferably parallel, said lateral wall being shown as of thickened construction and recessed to form a groove 35, although the equivalent of the groove 33 could be formed by spaced outer and inner conical projections formed on or attached to the outer wall of the impeller. Mounted in said groove 35 is a ring 36 which under normal conditions will be so positioned as to close the passage through the clearance space 27, but under the action of centrifugal force will be withdrawn within the groove 35 as shown in Fig. 1 and open said clearance space 27 to the suction developed by the impeller 15.

The ring 36 is shown in enlarged section in Feb. 4 and may be formed of any suitable material, preferably of the same coefficient of expansion as the impeller 15. It is made of a plurality of sections, four being preferred, although a smaller or larger number may be used if found desirable. The faces 37 and 38 of said ring have the same angles of conicity as the surfaces 33 and 34. The outer face of the ring, as shown, is provided with a groove 39 in which is disposed a work spring 40 that is under tension so as to contract the sections of the ring to its smallest diameter. When the shaft is rotated, centrifugal force, acting on the ring 36, causes the same to expand outwardly against the action of its spring, and slide along the sloping surface 33, whereby the ring is withdrawn within the groove 35 and the clearance space 27 is opened. When the shaft stops rotating, however, the tension of the worm spring contracts the sections of the ring 36, causing the same to move downwardly and outwardly along the surface 34 until it closes the passage through the clearance space 27. Thereby any liquid within the impeller housing cannot escape through said clearance space.

In operation the impeller 14 takes liquid from the interior of the pump casing and imposes an initial pressure thereon. This liquid under pressure is delivered to the inlet ends of the pipes 16, and by said pipes, which rotate with the two impellers 14 and 15, the liquid at said pressure is delivered to the inlets 19 of the impeller 15. Impeller 15 then imposes a materially higher pressure on said liquid and delivers said liquid to the chamber 31 in the interior of the impeller housing 21. From the chamber 31 the liquid can flow back to clearance 13 at the spaces within housing 12 between the pipes 16. As the liquid in the chamber 31 is under higher pressure than the liquid in the pump casing there is liquid flow only from the exterior to the interior of the pump casing through the clearance 13. Thereby a liquid seal is maintained at this clearance which does not involve the action of rubbing surfaces. At the same time the air spaces 27 and 30 at the opposite side of impeller 15 from the pump casing are held under a small suction by reason of the action of the impeller 15 at the inner end of the clearance space 30 so that outward flow of liquid is prevented. As long as the shaft is rotating ring 36 is held in its expanded condition, but against the tension of the worm spring 40 by the centrifugal force acting on said ring 36, whereby the clearance space 27 is held open, but as soon as the shaft slows down to a speed at which centrifugal force cannot overcome the tension of said worm spring, said worm spring contracts the ring 36, sliding it down the inclined surface 34 to close the clearance space 27 and prevent any flow of liquid out of the impeller housing.

While some energy is of course used in driving the impellers to build up the liquid pressure in the chamber 31 in the impeller housing and delivering the same through housing 12 to the clearance 13, the energy lost through driving of the impellers is small as compared with the energy lost in overcoming friction if packing material is maintained under sufficient compression to assure against leakage along the shaft.

The invention as so far described can be employed with equal facility with liquids carrying substantial quantities of solid material as well as with filtered liquid. If the liquid handled by the pump is well filtered or otherwise comparatively free from solid material that can plug up small openings, a somewhat simpler construction using the pressure of the liquid developed by the pump itself may be employed as shown in Fig. 5. In this embodiment of the invention a pipe 41 leads from any suitable point such as the interior of the pump casing where liquid under pressure developed by the pump can be withdrawn. Pipe 41 delivers to a channel 42, sometimes herein called a second portion of the seal housing, which may be formed in any suitable way in the wall of the seal housing 12 and which extends through 360° of circumference so as to constitute a rotor encircling chamber. Closing the open side of said channel 42 is a plate 43 which may be mounted in any suitable way on the housing 12, forming the inner wall of the housing member 44. At the inner periphery of the channel 42 said plate 43 provides a narrow annular clearance opening 45 which is at the inlet end of what is herein sometimes called a restricted passage or portion leading from the channel 42 so that a fine jet of liquid under pressure, escaping from the channel 42, is provided through 360° of circumference.

Mounted on the shaft 10 is an impeller member 46 having at its inner side adjacent the shaft a conical extension 47 on which is provided, by suitable baffles or grooves, liquid propulsion channels 48. Said channels underlie the circumferential jet escaping through the clearance 45 and are suitably shaped so as to propel the liquid inwardly along the shaft through the inner first portion or passage of the seal chamber in the seal housing 12 and thence to and through the clearance 49 between the periphery of said shaft and the surrounding wall of the pump casing. The housing 44 for the impeller has an outer wall 50 providing a narrow clearance space 51 with the outer face of the impeller 46, herein sometimes called the outer or second portion of the passage leading from the terminal opening to the inner portion or passage, and to seal this clearance space a ring 36 as used in the embodiment of Figs. 1 to 4 may be employed.

The liquid is delivered under pressure to the channel 42 and flows therefrom through the clearance 45 in the form of a jet. This jet, coacting with the grooves or baffle surfaces 48 on the extension 47 of the impeller member 46, establishes a small suction in the clearance space 51 around the impeller member, which space is in open communication with the outside air when the shaft is rotating, but closed by the ring 36 when the shaft is at rest. The liquid escaping through clearance 45 is propelled by the extension on the impeller member 46, inwardly to and through the clearance 49 between the shaft and the surrounding casing wall, and as the pressure of this liquid is higher than that within the pump casing the liquid flow is only from the outside to the inside of the pump casing.

The construction of the seal housing and rotor parts within the housing is, in both forms of the invention herein presented, such as to provide what may be termed a rotor-encircling passage extending continuously from the terminal opening 26 to the fluid chamber. Into this rotor-encircling passage a second passage enters through an annular opening in the rotor-encircling passage in such relationship thereto as to provide an effect of aspiration at the junction. In the first form of the invention this second passage may be considered as comprising the impeller vanes 15 and the vane openings adjacent the opening of the clearance space 30. In the second form of the invention illustrated in Figure 5, this second passage is indicated at 42 and 45. The annular opening is at the junction of this second passage with the continuous rotor-encircling passage and, at this junction, fluid issuing from the vanes 15 in the one case or through the annular opening 45 in the second case sucks air by aspiration through the terminal opening 26. This rotor-encircling passage, extending from the terminal opening 26 to the fluid chamber, may be considered as divided into an inner portion extending from the point of aspiration to the fluid chamber and an outer portion extending from the terminal opening 26 to the point of aspiration. To take another viewpoint in describing the seal chamber, the chamber 42 shown in Figure 5 may be considered as a rotor-encircling chamber and the passage from this chamber 42 through clearance 45 and the chamber 49 to the fluid chamber may be termed a first passage and the spaces or voids from the terminal opening 26 to the point of aspiration adjacent 45 may be termed a second passage which opens into the first passage close to the beginning of this first passage which beginning is where fluid leaves the annular chamber 42 to enter the short clearance passage 45.

It will therefore be perceived that by the present invention a shaft sealing means has been provided which eliminates the friction losses and wear of glands employing packing as heretofore commonly used, while at the same time complicated and expensive accessory systems for delivering or withdrawing liquids or taking care of waste liquid, etc., have been avoided. By means of a simple construction, easily manufactured, installed and maintained, a fluid withdrawn from a suitable point such as the interior of the casing by the action of a unit rotating with the shaft has imposed thereon a pressure which is in excess of that within the pump casing so that the flow is only from the outside to the inside of the casing through such clearance as exists between the periphery of the shaft and the wall of the casing. Such clearance spaces as are open to the air are maintained under a small subatmospheric pressure so that air flows therethrough to the interior of the sealing device to prevent escape of fluid therefrom. When the shaft stops, however, said clearance spaces are sealed off so as to prevent the escape of fluid. Thus a simple and highly efficient sealing device has been provided.

While the embodiments of the invention illustrated on the drawing have been described with considerable particularity it is to be expressly understood that the invention is not limited thereto, as various other embodiments of the invention will now suggest themselves to those skilled in the art, while changes may be made in the details of construction, arrangement and proportion of parts, materials used, etc., without departing from the spirit of this invention. Reference is therefore to be had to the appended claims for a definition of said invention.

What is claimed is:

1. In a device for sealing a clearance between a rotatable shaft and the contiguous wall of a casing, the combination of a housing surrounding said shaft and providing a chamber in communication with said clearance, rotatable impelling means in said housing mounted on said shaft to rotate therewith and adapted to generate a fluid pressure in said chamber and propel the fluid to said clearance at a pressure in excess of the pressure interiorly of said casing adjacent said clearance, means for withdrawing fluid from the interior of said casing and delivering it to said impelling means, said housing providing with said impelling means an air filled clearance space at the side of said impelling means remote from said casing and said impelling means being so related to said air filled clearance space that the said impulsion of fluid creates a suction on the air in said air filled clearance space, and means for automatically opening and closing said air filled clearance space when the shaft respectively is in rotation and at rest.

2. In a device for sealing a clearance between a rotatable shaft and the contiguous wall of a liquid-containing casing, the combination of a housing surrounding said shaft and in communication with said clearance, impelling means in said housing mounted on said shaft to rotate therewith and adapted to deliver liquid from said housing to said clearance at a pressure in excess of the pressure interiorly of said casing adjacent said clearance, means for withdrawing liquid from the interior of said casing and delivering it to said impelling means, said housing providing with said impelling means an air filled clearance space at the side of said impelling means remote from said casing and said impelling means being so related to said air filled clearance space that the said impulsion of said liquid creates a suction on the air in said air filled clearance space, and means for automatically opening and closing said air filled clearance space when the shaft respectively is in rotation and at rest, said last named means including an expansible ring mounted on said impelling means to rotate therewith and be subjected to centrifugal force, said ring when contracted closing said clearance space, and means cooperating with said ring to withdraw the same from said clearance space as said ring expands under the action of centrifugal force.

3. In a device for sealing a clearance between a rotatable shaft and the contiguous wall of a liquid-containing casing, the combination of a housing surrounding said shaft and in communication with said clearance, impelling means in said housing mounted on said shaft to rotate therewith and adapted to deliver liquid from said housing to said clearance at a pressure in excess of the pressure interiorly of said casing adjacent said clearance, means for withdrawing liquid from the interior of said casing and delivering it to said impelling means, said housing providing with said impelling means an air filled clearance space at the side of said impelling means remote from said casing and said impelling means being so related to said air filled clearance space that the said impulsion of said liquid creates a suction on the air in said air filled clearance space, and means for automatically opening and closing said air filled clearance space when the shaft respectively is in rotation and at rest, said last named means including an expansible ring mounted on said impelling means to rotate therewith and be subjected to centrifugal force, said ring when contracted closing said clearance space, means cooperating with said ring to withdraw the same from said clearance space as said ring expands under the action of centrifugal force, and resilient means cooperating with said ring and normally tending to contract said ring into said clearance space but yieldable under the action of centrifugal force to provide for withdrawal of said ring from said clearance space.

4. In a device for sealing a clearance between a rotatable shaft and the contiguous wall of a casing, a housing surrounding said shaft exteriorly of said casing and in communication with said clearance, an impeller mounted on said shaft in said housing and rotated thereby, means providing one or more passages for fluid in communication with said impeller at one end and the interior of said casing at the other end, said last named means leaving passages for the return of fluid from said housing to said casing through said clearance, said impeller withdrawing fluid from the interior of said casing through said first named passages and developing a pressure on said fluid in said last named passages in excess of the pressure interiorly of said casing adjacent said clearance whereby fluid in said housing flows back into said casing through said last named passages, and impelling means mounted on said shaft interiorly of said casing and developing an initial pressure at the inlets of said first named passages.

5. In a device for sealing a clearance between a rotatable shaft and the contiguous wall of a casing, a housing surrounding said shaft exteriorly of said casing and in communication with said clearance, an impeller mounted on said shaft in said housing and rotated thereby, means providing one or more passages for fluid in communication with said impeller at one end and the interior of said casing at the other end, said last named means leaving passages for the return of fluid from said housing to said casing through said clearance, said impeller withdrawing fluid from the interior of said casing through said first named passages and developing a pressure on said fluid in said last named passages in excess of the pressure interiorly of said casing adjacent said clearance whereby fluid in said housing flows back into said casing through said last named passages, said housing and said impeller providing an air filled clearance space at the side of said impeller remote from said casing and said impeller cooperating with said clearance space to maintain a suction therein.

6. In a device for sealing a clearance between a rotatable shaft and the contiguous wall of a liquid-containing casing, a housing surrounding said shaft exteriorly of said casing and in communication with said clearance, an impeller mounted on said shaft in said housing and rotated thereby, means providing one or more passages for liquid in communication with said impeller at one end and the interior of said casing at the other end, said last named means leaving passages for the return of liquid from said housing to said casing through said clearance, said impeller withdrawing liquid from the interior of said casing through said first named passages and developing a pressure on said liquid in said last named passages in excess of the liquid presure interiorly of said casing adjacent said clearance whereby liquid in said housing flows back into said casing through said last named passages, said housing and said impeller providing an air filled clearance space at the side of said impeller remote from said casing and said impeller cooperating with said clearance space to maintain a suction therein, and automatic means mounted on said impeller for opening and closing said clearance space when the shaft respectively is in rotation and at rest.

7. In a device for sealing a clearance between a rotatable shaft and the contiguous wall of a liquid-containing casing, a housing surrounding said shaft exteriorly of said casing and in communication with said clearance, an impeller mounted on said shaft in said housing and rotated thereby, means providing one or more passages for liquid in communication with said impeller at one end and the interior of said casing at the other end, said last named means leaving passages for the return of liquid from said housing to said casing through said clearance, said impeller withdrawing liquid from the interior of said casing through said first named passages and developing a pressure on said liquid in said last named passages in excess of the liquid pressure interiorly of said casing adjacent said clearance whereby liquid in said housing flows back into said casing through said last named passages, said housing and said impeller providing an air filled clearance space at the side of said impeller remote from said casing and said impeller cooperating with said clearance space to maintain a suction therein, and automatic means mounted on said impeller for opening and closing said clearance space when the shaft respectively is in rotation and at rest, said last named means including an expansible ring, resilient means cooperating with said ring to contract the same, and an inclined surface cooperating with said ring to cam said ring out of said clearance space when said ring expands under the action of centrifugal force.

8. In a device for sealing a clearance between a rotatable shaft and the contiguous wall of a casing, a housing surrounding said shaft exteriorly of said casing and in communication with said clearance, a rotatable member mounted on said shaft within said housing and providing fluid propulsion means, a channel providing a circumferential jet in cooperation with said propulsion means, and means for conveying fluid under pressure from said casing to said channel, said propulsion means cooperating with said jet to deliver fluid to said clearance at a pressure in excess of the pressure within said casing adjacent said clearance.

9. In a device for sealing a clearance between a rotatable shaft and the contiguous wall of a casing, a housing surrounding said shaft exteriorly of said casing and in communication with said clearance, a rotatable member mounted on said shaft within said housing and providing fluid propulsion means, a channel providing a circumferential jet in cooperation with said propulsion means, and means for conveying fluid under pressure from said casing to said channel, said propulsion means cooperating with said jet to deliver fluid to said clearance at a pressure in excess of the pressure within said casing adjacent said clearance, said rotatable member and said housing providing an air filled clearance space at the side of said rotatable member remote from said casing, and said propulsion means cooperating with said clearance space to create a suction therein.

10. In a device for sealing a clearance between a rotatable shaft and the contiguous wall of a liquid-containing casing, a housing surrounding said shaft exteriorly of said casing and in communication with said clearance, a rotatable member mounted on said shaft within said housing and provided with liquid propulsion means, a channel providing a circumferential jet in cooperation with said propulsion means, means for conveying liquid under pressure from said casing to said channel, said propulsion means cooperating with said jet to deliver liquid to said clearance at a pressure in excess of the pressure within said casing adjacent said clearance, said rotatable member and said housing providing an air filled clearance space at the side of said rotatable member remote from said casing, and said propulsion means cooperating with said clearance space to create a suction therein, an expansible and collapsible ring mounted on said rotatable member and subjected to centrifugal force, means cooperating with said ring to contract the same and urge said ring into a position closing said clearance space, and means cooperating with said ring to withdraw said ring from said clearance space as said ring expands under the action of centrifugal force.

11. In a device for sealing a clearance between a rotatable shaft and a contiguous wall of a liquid-containing casing, in combination with impelling means for withdrawing liquid from said casing and returning the liquid to said clearance under a pressure in excess of the pressure within said casing adjacent said clearance, a housing cooperating with said impelling means and providing an air filled clearance space at the side of said impelling means remote from said casing, and means for opening and closing said clearance space when the shaft is respectively in rotation and at rest, said last named means including an expansible and collapsible ring rotatable with said impelling means and subjected to centrifugal force when said impelling means is in rotation, means cooperating with said ring to contract the same when said ring is at rest, and means cooperating with said ring to withdraw said ring from said clearance space as said ring expands.

12. In a device for sealing a clearance between a rotatable shaft and a contiguous wall of a liquid-containing casing, in combination with impelling means for withdrawing liquid from said casing and returning the liquid to said clearance under a pressure in excess of the pressure within said casing adjacent said clearance, a housing cooperating with said impelling means and providing an air filled clearance space at the side of said impelling means remote from said casing, and means for opening and closing said clearance space when the shaft is respectively in rotation and at rest, said last named means including a ring composed of a plurality of sectors, a spring cooperating with said ring circumferentially to contract said ring to its smallest diameter, and a conical surface carried by said impelling means and on which said ring is mounted, said inclined surface camming said ring out of said clearance space when said ring expands.

13. In a device for sealing a clearance between a rotatable shaft and a contiguous wall of a liquid-containing casing, a housing surrounding said shaft exteriorly of said casing, and impelling means mounted on and rotatable with said shaft within said housing for withdrawing liquid from the interior of said casing and delivering said liquid to said clearance at a pressure in excess of the pressure within said casing adjacent said clearance, said last named means including a rotatable unit composed of an impeller in said housing, and conduits in communication with the inlet of said impelling means and extending through said clearance space to the interior of said casing, said conduits providing intermediate spaces through which the liquid under pressure is returned to said casing.

14. In a device for sealing a clearance between a rotatable shaft and a contiguous wall of a liquid-containing casing, a housing surrounding said shaft exteriorly of said casing, and impelling means mounted on and rotatable with said shaft within said housing for withdrawing liquid from the interior of said casing and delivering said liquid to said clearance at a pressure in excess of the pressure within said casing adjacent said clearance, said last named means including a rotatable unit composed of an impeller in said housing, conduits in communication with the inlet of said impelling means and extending through said clearance space to the interior of said casing, said conduits providing intermediate spaces through which the liquid under pressure is returned to said casing, and a second impeller within said casing for delivering liquid at an initial pressure to the inlets of said conduits.

15. In a seal for preventing a leakage flow of fluid from a fluid chamber between a rotor and the fluid chamber housing, said rotor and housing being relatively rotatable and spaced from each other, the combination of a seal housing providing with said rotor the walls of an annular seal chamber having a communicating opening with said fluid chamber, said opening encircling said rotor, said seal housing extending axially outwardly from the fluid chamber along the rotor to a terminal opening in said seal housing for said rotor, said seal housing being spaced from the rotor at all zones longitudinally of the rotor to provide clearance therefrom and the walls of said seal chamber being formed to provide a continuous rotor encircling passage from said terminal opening to said communicating opening, and a second passage having an annular outlet for introducing into said encircling passage a rotor-encircling fluid stream, said encircling passage and outlet of said second passage at their junction being directed toward said communicating opening so as to be in aspirating relationship to suck ambient fluid through the terminal opening, a source of fluid connected to said second passage, and fluid pressure generating means for maintaining a continuous stream of fluid from said source through said second passage, past said junction and to and through said communicating opening.

16. In a seal for preventing a leakage flow of fluid from a fluid chamber between a rotor and the fluid chamber housing, said rotor and housing being relatively rotatable and spaced from each other, the combination of a seal housing providing with said rotor the walls of an annular seal chamber having at its inner end a communicating opening with said fluid chamber, and at its outer end a terminal opening, and between said openings a rotor-encircling passage connecting said openings to provide a clearance chamber encircling said rotor, said seal housing providing an annular opening into said passage intermediate said communicating and terminal openings, dividing said passage into inner and outer end portions, a source of fluid connected to said annular opening, means for maintaining a continuous flow of fluid from said source through said annular opening and through the inner end portion of said passage to and through said communicating opening to and into said fluid chamber, the inner extremity of said outer end portion and said annular opening at their junction being directed toward said communicating opening so as to be in aspirating relationship to draw ambient fluid through the terminal opening and the outer portion of said passage into the inner portion of said passage, and a contact sealing means for normally closing off said terminal opening against pressure fluid within said seal housing by effecting an annular sealing contact between the said rotor and seal housing adjacent said opening, said contact sealing means being responsive upon rotation of the rotor to break said contact when the machine is in operation.

17. In a seal for preventing a leakage flow of fluid from a fluid chamber between a rotor and the fluid chamber housing, said rotor and housing being relatively rotatable and spaced from each other, the combination of a seal housing providing with said rotor the walls of an annular seal chamber having at its inner end a communicating opening with said fluid chamber, and at its outer end a terminal opening, said openings encircling said rotor, and having a rotor-encircling passage connecting said openings to provide a clearance chamber encircling said rotor, said seal housing providing an annular opening into said passage intermediate said communicating and terminal openings, dividing said passage into inner and outer end portions, means for conducting fluid from said fluid chamber to said annular opening, means for maintaining a continuous flow of fluid from said fluid chamber through said annular opening, and through the inner end portion of said passage to and through said communicating opening to and into said fluid chamber, said annular opening at its junction with said passage being directed at an angle to the axis of said rotor and toward said communicating opening so as to be in aspirating relationship to draw ambient fluid through the terminal opening and the outer portion of said passage into the inner portion of said passage, and a contact sealing means for normally closing off said terminal opening against pressure fluid within said seal housing by effecting an annular sealing contact between the said rotor and seal housing adjacent said opening, said contact sealing means being responsive to rotation of the rotor to break said contact when the machine is in operation.

18. In a seal for preventing a leakage flow of fluid from a fluid chamber between a rotor and the fluid chamber housing, said rotor and housing being relatively rotatable and spaced from each other, and said fluid chamber having under operative conditions zones of relatively high and low pressure, the combination of a seal housing providing with said rotor the walls of an annular seal chamber having a communicating opening with said fluid chamber, said opening encircling said rotor and opening into said fluid chamber at a relatively low pressure zone thereof, said seal housing extending axially outwardly from the fluid chamber along the rotor to a terminal opening in said seal housing for said rotor, said seal housing being spaced from the rotor at all zones longitudinally of the rotor to provide clearance therefrom, the walls of said seal chamber being formed to provide a rotor-encircling chamber, a first annular passage from said rotor-encircling chamber to said communicating opening, and a second annular passage from said terminal opening to a junction with said first passage, means for introducing into said rotor-encircling chamber a continuous supply of fluid from a relatively high pressure zone of the fluid chamber, said first and second passages at said junction being directed toward said communicating opening so as to be in aspirating relationship for sucking ambient fluid through said terminal opening, and a contact sealing means for normally closing off said terminal opening against pressure fluid within said seal housing when the rotor ceases to rotate.

19. In a seal for preventing a leakage flow of fluid from a fluid chamber between a rotor and the fluid chamber housing, said rotor and housing being relatively rotatable and spaced from each other, the combination of a seal housing providing with said rotor the walls of an annular seal chamber having a communicating opening with said fluid chamber, said opening encircling said rotor, said seal housing extending axially outwardly from the fluid chamber along the rotor to a terminal opening in said seal housing for said rotor, said seal housing being spaced from the rotor at all zones longitudinally of the rotor to provide clearance therefrom, the walls of said seal chamber being formed to provide a rotor-encircling chamber, a first annular passage from said rotor-encircling chamber to said communicating opening, and a second annular passage from said terminal opening to a junction with said first passage, means for introducing into said rotor-encircling chamber a continuous supply of fluid, pressure generating means for maintaining a continuous annular fluid stream in said first passage from said rotor-encircling chamber to and through said communicating opening, said first and second passages being substantially contiguous and directed toward said communicating opening where said second passage has its junction with said first passage so as to be in aspirating relationship for sucking ambient fluid through said terminal opening, and a contact sealing means for normally closing off said terminal opening against pressure fluid within said seal housing by effecting an annular sealing contact between the said rotor and seal housing adjacent said opening, said contact sealing means being responsive upon rotation of the rotor to break said contact.

20. In a seal for preventing a leakage flow of fluid from a fluid chamber between a rotor and the fluid chamber housing, said rotor and housing being relatively rotatable and spaced from each other, the combination of a seal housing providing with said rotor the walls of an annular seal chamber having a communicating opening with said fluid chamber, said opening encircling said rotor, said seal housing extending axially outwardly from the fluid chamber along the rotor to a terminal opening in said seal housing for said rotor, said seal housing being spaced from the rotor at all zones longitudinally of the rotor to provide clearance therefrom, said seal chamber comprising a first portion surrounding the rotor adjacent the fluid chamber, a restricted first passage surrounding the rotor and communicatingly connecting said terminal opening with said first portion, a rotor-encircling chamber remote from the fluid chamber, an annular restricted second passage connecting said first chamber portion and said rotor-encircling chamber, said two passages being substantially contiguous and directed toward said first portion where they open into the latter so as to be in aspirating relationship, and means including conduit means separate from the seal chamber for conducting fluid from the fluid chamber into said rotor-encircling chamber at a fluid pressure greater than the fluid pressure in said seal chamber, the walls of said seal chamber being formed to conduct, direct and discharge said introduced fluid in a continuous annular stream from said rotor-encircling chamber toward, into and through said second restricted passage of the seal chamber and in a flow direction away from said terminal opening, and through said first chamber portion to the fluid chamber in an annular stream surrounding said rotor whereby said introduced fluid is returned continuously to the fluid chamber through said second restricted passage and a sub-ambient pressure is established at said terminal opening.

21. In a seal for preventing a leakage flow of fluid from a fluid chamber between a rotor and the fluid chamber housing, said rotor and housing being relatively rotatable and spaced from each other, and said fluid chamber under operative conditions having zones of relatively high and low pressure, the combination of a seal housing providing with said rotor the walls of an annular seal chamber having at its inner end a communicating opening with said fluid chamber at a low pressure zone thereof, and at its outer end a terminal opening, said openings encircling said rotor, and having a rotor-encircling passage connecting said openings to provide a clearance chamber encircling said rotor, the walls of said seal housing being formed to provide an annular opening joining said passage intermediate said communicating and terminal openings, dividing said passage into inner and outer end portions, and means for conducting fluid at substantially the pressure existing in the high pressure zone of said fluid chamber to said annular opening, said annular opening having its defining walls where it joins said passage directed toward said communicating opening so as to maintain an aspirating relationship between the said annular opening and the outer end portion of said passage to draw ambient fluid through the terminal opening and the outer end portion of said passage into the inner end portion of said passage.

O. B. SUMMERS.

REFERENCES CITED

The following references are of record in the file of this patent:

UNITED STATES PATENTS

| Number | Name | Date |
|---|---|---|
| 1,122,051 | Wohlenberg | Dec. 22, 1914 |
| 1,353,095 | Uttech | Sept. 14, 1920 |
| 1,558,630 | Reed | Oct. 27, 1925 |
| 1,715,597 | Haug | June 4, 1929 |
| 1,949,429 | McGee | Mar. 6, 1934 |